Oct. 21, 1969     R. R. POOLE     3,473,766
RESILIENT SUPPORTS AND ASSEMBLIES INCORPORATING THE SAME
Filed Jan. 29, 1968     2 Sheets-Sheet 1
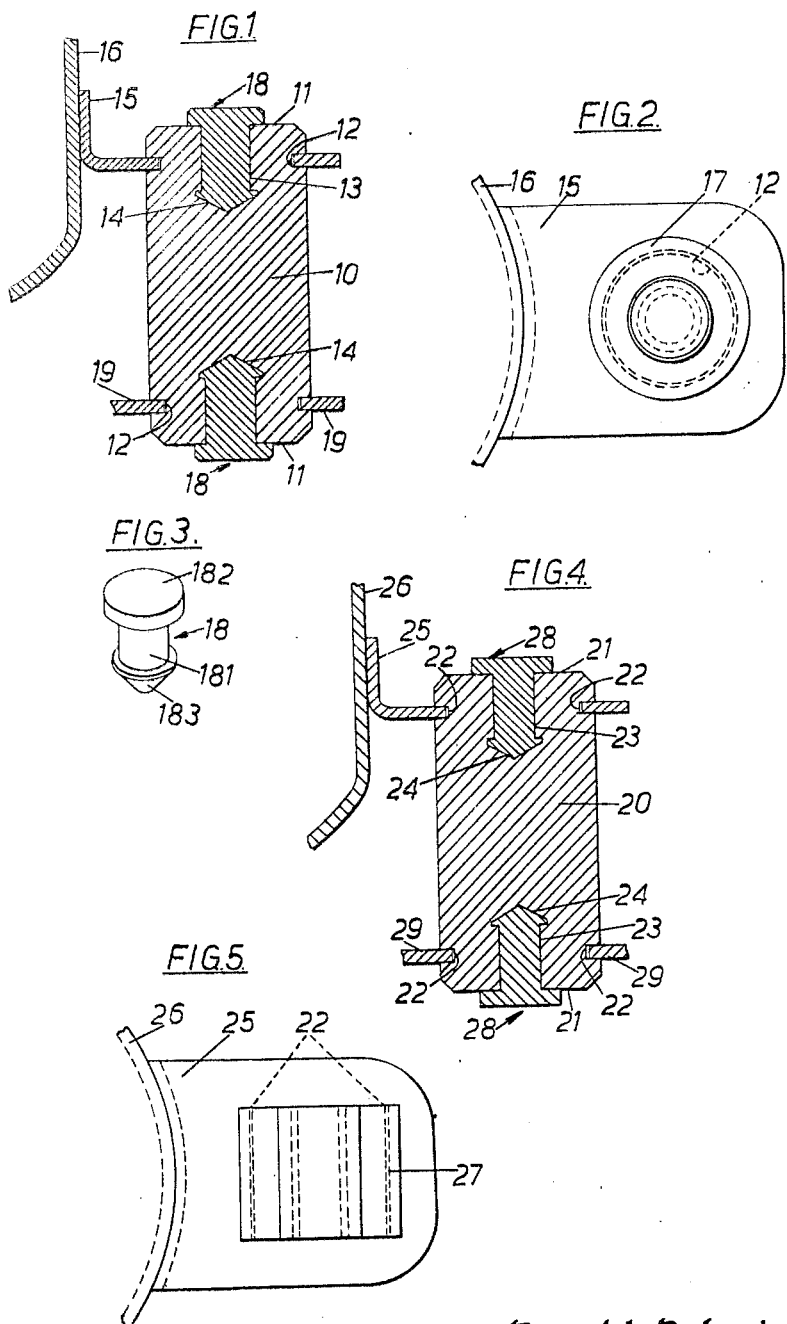
Inventor
Ronald Robertson Poole
BY
*J.C.Evans*
Attorney Oct. 21, 1969    R. R. POOLE    3,473,766
RESILIENT SUPPORTS AND ASSEMBLIES INCORPORATING THE SAME
Filed Jan. 29, 1968    2 Sheets-Sheet 2
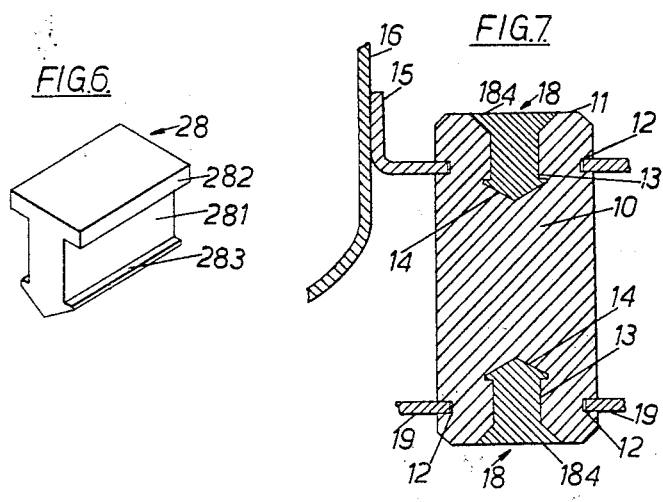
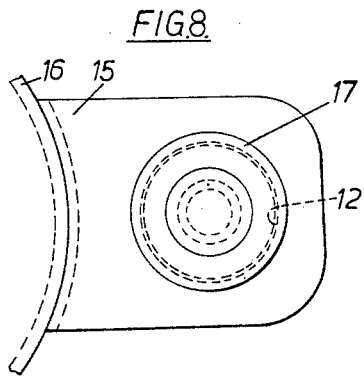
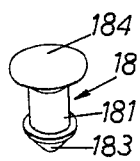
Inventor
Ronald Robertson Poole
BY
J.C. Evans
Attorney

United States Patent Office 3,473,766
Patented Oct. 21, 1969

3,473,766
RESILIENT SUPPORTS AND ASSEMBLIES INCORPORATING THE SAME
Ronald Robertson Poole, South Brent, England, assignor to General Motors Corporation, Detroit, Mich., a corporation of Delaware
Filed Jan. 29, 1968, Ser. No. 701,152
Claims priority, application Great Britain, Feb. 2, 1967, 5,121/67
Int. Cl. F16m 1/00; F16f 15/04; F16b 13/04
U.S. Cl. 248—15         2 Claims

ABSTRACT OF THE DISCLOSURE

A resilient support member, for example for a rotary compressor unit of a refrigerator, comprises a block of elastomeric material having adjacent one end an external groove, and a blind hole which extends into the block and terminates, beyond the groove, in an enlarged inner end.

---

There may be external grooves at both ends of the block such that one interfits with an apertured bracket of the rotary compressor, and the other interfits with a corresponding apertured bracket or other support of a cabinet of the refrigerator.

This invention relates to resilient support members and to assemblies including such members.

A resilient support member according to the invention is one in which a block of elastomeric material has adjacent one end an external groove, and a blind hole which extends into the block and terminates, beyond the groove, in an enlarged inner end.

Preferably the groove is disposed in a plane normal to a longitudinal axis of the hole.

The block may be circular in cross-section and have an annular groove, or the block may be rectangular in cross-section and have a pair of external grooves in opposed side surfaces of the block.

Preferably the resilient support member has a second groove and blind hole adjacent the opposite end of the block.

A resilient support assembly according to the invention may comprise such a block of elastomeric material and secured to an apertured bracket by the interfitting of the grooved end of the block within the aperture in the bracket, and a plug is inserted into the hole in the block to stress the block against the bracket.

In the drawings:

FIGURE 1 is a sectional elevation of one embodiment of a support member and support assembly according to the invention;

FIGURE 2 is a plan of the support member and assembly of FIGURE 1;

FIGURE 3 is a perspective view of one of the block plugs of FIGURE 1;

FIGURES 4, 5 and 6 are views similar to FIGURES 1–3 of a second embodiment of the invention and FIGURES 7, 8 and 9 are views similar to FIGURES 1–3 of a further embodiment of the invention.

The embodiments of the invention will now be described with reference to the drawings as shown in one specific application, that is as a support for the mounting of a motor compressor unit in a refrigerator. The refrigerator is a conventional domestic unit having a cabinet, for the storage of food, and cooled by a conventional refrigerant compressor system. Such a refrigerator unit forms no part of the invention and will not be further described.

In the first embodiment of the invention the resilient member is formed of a solid block 10 of rubber or like elastomeric material of cylindrical shape. Near each end surface 11 of the block there is formed a circumferential annular groove 12. (FIGURE 1). From each end surface 12 of the block a blind hole 13, of circular cross-section, extends into the block 10 and terminates, beyond the groove 12, in an enlarged chamber 14. Each groove 11 is disposed in a plane normal to a longitudinal axis of the respective hole 13.

The block 10 is secured to a sheet metal bracket or support 15 fixed to the refrigerator compressor casing 16 (shown in part in FIGURES 1 and 2). The bracket 15 has an aperture 17 which in this embodiment is a circular hole of slightly greater diameter than the inner diameter of the groove 11, (the top one, in FIGURE 1). In assembly, the block 10 is pushed into the bracket hole 17 until the groove 11 fits in the hole 17 and the walls of the groove 11 overlie the bracket 15, as shown in FIGURE 1. The resilience of the block 10, and the presence of the hole 13, enable the block to be deformed sufficiently to pass through the aperture or hole 17 for interfitting of the block with the bracket at the grooved portion. A plug 18 of a material at least as hard as that of the block is then pushed into the block hole 13 to stress the block outwardly against the bracket 15 and thus to resist any inward deformation of the block such as would enable it to disengage the bracket axially. In FIGURES 1 and 2, the block 10 is shown fitted within the bracket 15 with slight clearance between the groove base and the periphery of the aperture 17. This is so shown for the sake of clarity of illustration of the parts described. In practice the block would be stressed against the bracket with substantially no clearance therebetween.

The plug 18 (FIGURE 3) has a cylindrical shank 181, an enlarged head 182, and an enlarged base 183. The shank and base are so shaped and dimensioned that upon insertion of the plug into the hole 13 (the upper one in FIGURE 1), they fill the hole, and the plug is retained in the hole by the interfitting of the plug base 183 and the enlarged chamber 14 of the block. The enlarged head 182 of the plug 18 abuts the end surface 12 of the block 10.

The block 10 is also secured in like manner (at its lower end in FIGURE 1) in a bracket or support 19 (shown in part in FIGURE 1), on the refrigerator cabinet (not shown). For ease of manufacture the grooves 11, have the same shape and dimensions, the blind holes 13 are the same as one another, and the plugs 18 are also shaped and dimensioned like one another.

The block 10 is formed as a moulding, the resilience of the block permits the blind holes 13 and enlarged chamber 14 to be formed in the moulding operation, the male portions of the mould being pulled out when the resilient block is released from the mould cavity.

FIGURES 4, 5 and 6 show a second embodiment of the invention. In this embodiment the resilient block 20 of rubber or like elastomeric material is of rectangular shape. Near each end surface 21 of the block there is formed a pair of grooves 22, the grooves being in opposed ones of the side surfaces of the block, as shown in FIGURE 4. From each end surface 22 of the block a blind hole 23, of rectangular cross-section, extends into the block 20 and terminates, beyond the respective pair of opposed grooves 21, in an enlarged chamber 24 (FIGURE 4). Each groove 21 is disposed in a plane normal to a longitudinal axis of the respective hole 23.

The block 20 is secured to a sheet metal bracket or support 25 fixed to the refrigerator compressor casing 26 (shown in part in FIGURES 3 and 4). The bracket 25 has a rectangular aperture or hole 27 of slightly greater width than the width of the block from base to base of opposed ones of a pair of the slots 21 (the upper pair in FIGURE 4). In assembly, the block 20 is pushed through the aperture 27 until the opposed ones of a pair of grooves 21 fit in the aperture 27 and the walls of the slots overlie the bracket 25, as shown in FIGURE 4. The resilience of the block 20, and the presence of the hole 23, enable the block to be deformed sufficiently to pass through the aperture or hole 27 for interfitting of the block with the bracket at the grooved portion. A plug 28 of a material at least as hard as that of the block is then pushed into the block hole 23 to stress the block outwardly against the bracket 25, and thus to resist any inward deformation of the block such as would enable it to disengage the bracket axially.

In FIGURES 4 and 5 the block 20 is shown fitted within the bracket 25 with slight clearance between the groove bases and the periphery of the aperture 27. This is so shown for clarity of illustration, in practice the block would be stressed against the bracket with substantially no clearance therebetween.

The plug 28 (FIGURE 6) has a rectangular shank 281, an enlarged head 282 and an enlarged base 283. The shank and base are so shaped and dimensioned, that upon insertion of the plug into the hole 23 (the upper one in FIGURE 4), they fill the hole, and the plug is retained in the hole by the interfitting of the plug base 283 and the enlarged chamber 24 of the block. The enlarged head 282 of the plug 28 abuts the end surface 22 of the block 20.

The block 20 is also secured in like manner (at its lower end in FIGURE 4) in a bracket or support 29 (shown in part in FIGURE 4) on the refrigerator cabinet (not shown). For ease of manufacture this lower pair of grooves 21 and the hole 23 are similarly shaped and dimensioned as the upper ones for securing the block to the compressor.

The plugs 28 are made from extruded material, cropped or sawn into appropriate lengths.

FIGURES 7, 8 and 9 show a further embodiment of a resilient support member and support assembly according to the invention. This embodiment is similar to the first embodiment shown in FIGURES 1 to 3, and like numerals are used for like parts. It will be described only with reference to those parts wherein it differs from the first embodiment. The blind holes 13 which extend into the block 10 from each end surface 12 have, at their outer ends adjacent the surface 12, an enlarged conical portion 131, which can be considered as a countersink in the end surface 12. The plug 18 (FIGURE 9) has an enlarged head 184 so shaped and dimensioned that when the stud is pushed into the block the head fits into and fills the conical portion 131 or countersink in the end surface 12 of the block and is a flush fit with that surface.

Although in the embodiments described above, the block has been shown grooved at each end and with a blind hole at each end, there may be occasions when it would be more convenient to have but one end so formed, and the other end may be secured to a support in conventional manner.

I claim:

1. In combination, a resilient support in which a block of elastomeric material has two spaced apart end walls and at least one side wall interconnecting said end walls, said side walls having an external groove adjacent each of said end wall adapted to receive relatively movable supporting means, each of said end walls has therein a blind hole which extends a limited distance into said block and terminates in an enlarged chamber inwardly of said groove relative to said block, said block further having a section intermediate of said blind holes, the length of said section being greater than the depth of each of said blind holes, first and second spreading plugs each having a head portion, a conically shaped end portion, and a cylindrical portion joining said head portion and said end portion, said head portion of said plugs having a diameter larger than said cylindrical portion of said plugs, each of said plugs being located in one of said blind holes with said conically shaped end portion being positioned entirely within said enlarged chamber to cause said block of elastomeric material to spread into said external grooves to relatively rigidly interlock said block with one or the other of the relatively movable supporting means.

2. In combination, a resilient support assembly comprising a block of elastomeric material having two spaced apart end walls and at least one side wall interconnecting said end walls, said side wall has an external groove adjacent each of said end wall, a pair of relatively movable brackets, each of said brackets having an aperture therein, said block being secured to said brackets by the interfitting of said grooved ends of said block, each of said end walls has therein a blind hole which extends a limited distance into said block and terminates in an enlarged chamber inwardly of the grooves relative to said block, further having a section intermediate of said blind holes, the length of said section being greater than the distance from said end walls to said section, first and second spreading plugs each having a head portion, a conically shaped end portion, and a cylindrical portion adjoining said head portion and said end portion, said head portion of said plugs having a diameter larger than said cylindrical portion of said plugs, each of said plugs being located in one of said blind holes with said conically shaped end portion being positioned entirely within said enlarged chamber to cause said block of elastomeric material to spread into said external grooves to relatively rigidly interlock with said pair of relatively movable brackets.

References Cited

UNITED STATES PATENTS

| 2,156,301 | 5/1939 | Loewus | 248—358 |
| 2,903,208 | 9/1959 | Everitt | 248—9 |
| 2,951,674 | 9/1960 | Rice | 248—358 |
| 3,065,342 | 11/1962 | Worden | 85—82 X |
| 3,319,918 | 5/1967 | Rapata | 248—239 |

FOREIGN PATENTS 1,201,775  9/1965  Germany.

ROY D. FRAZIER, Primary Examiner

J. FRANKLIN FOSS, Assistant Examiner

U.S. Cl. X.R.

85—82; 248—18, 358